United States Patent [19]

Highby

[11] Patent Number: 4,703,578
[45] Date of Patent: Nov. 3, 1987

[54] CASTING ROD HAVING ONE-PIECE ROD AND HANDLE BODY

[75] Inventor: Dennis N. Highby, Sidney, Nebr.

[73] Assignee: Cabela's Inc., Sidney, Nebr.

[21] Appl. No.: 825,056

[22] Filed: Jan. 31, 1986

[51] Int. Cl.4 .......................................... A01K 87/00
[52] U.S. Cl. ...................................... 43/18.1; 43/18.5
[58] Field of Search .................. 43/18.1, 18.5, 20, 22, 43/23

[56] References Cited

U.S. PATENT DOCUMENTS

| 2,667,713 | 2/1954 | Stephens | 43/22 |
|---|---|---|---|
| 2,957,264 | 10/1960 | Ruff | 43/20 |
| 3,034,246 | 5/1962 | Davidson | 43/18.1 |
| 3,040,463 | 6/1962 | Levey | 43/20 |
| 3,314,186 | 4/1967 | Viveiros | 43/18.1 |
| 4,151,672 | 5/1979 | Lopez | 43/18.1 |
| 4,209,931 | 7/1980 | Vance | 43/23 |
| 4,516,351 | 5/1985 | Highby . | |

Primary Examiner—Kurt Rowan
Attorney, Agent, or Firm—Fields, Lewis, Pittenger & Rost

[57] ABSTRACT

A casting rod of the pistol grip type has a hollow one-piece molded rod and handle body that is continuous from end to end and preferably with the handle portion uncovered so there is no interruption of transmitted vibrations through said body from the tip of the rod to the hand of the user gripping the handle portion. In making the casting rod the mat material and thermosetting resin are placed on a mandrel in the same molding operation to form the one-piece rod and handle body.

19 Claims, 13 Drawing Figures

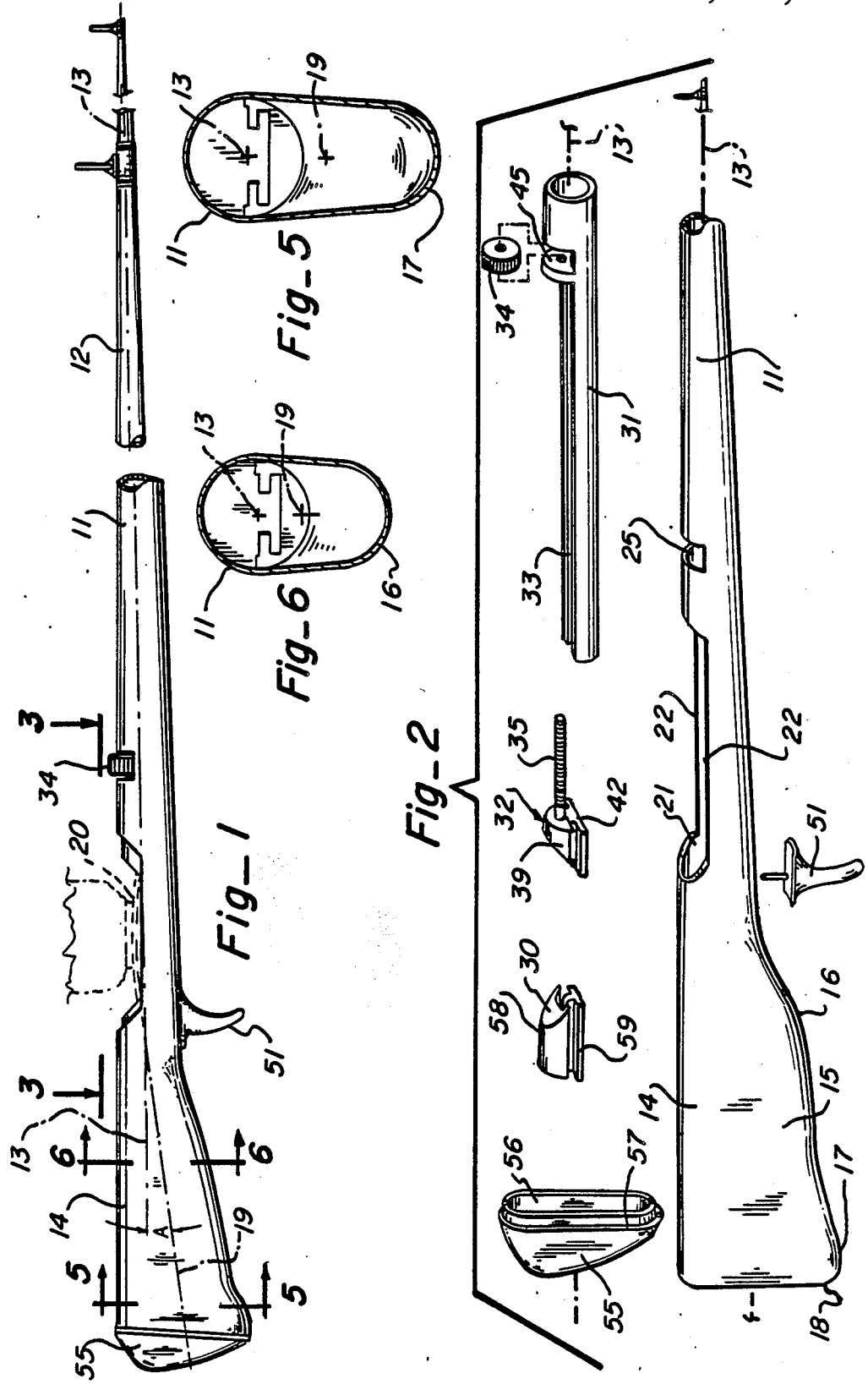

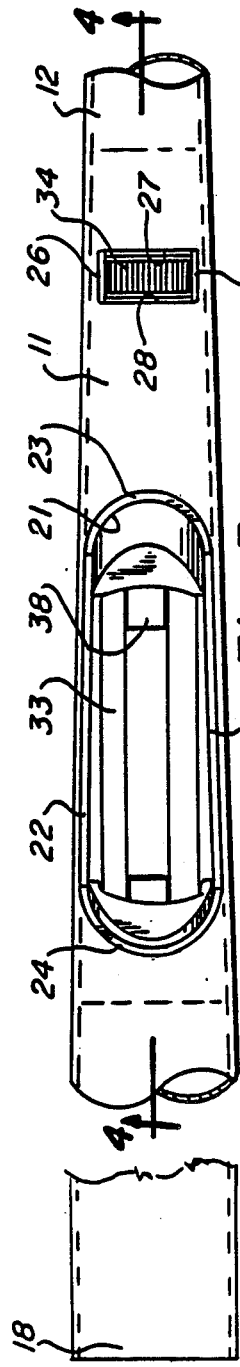
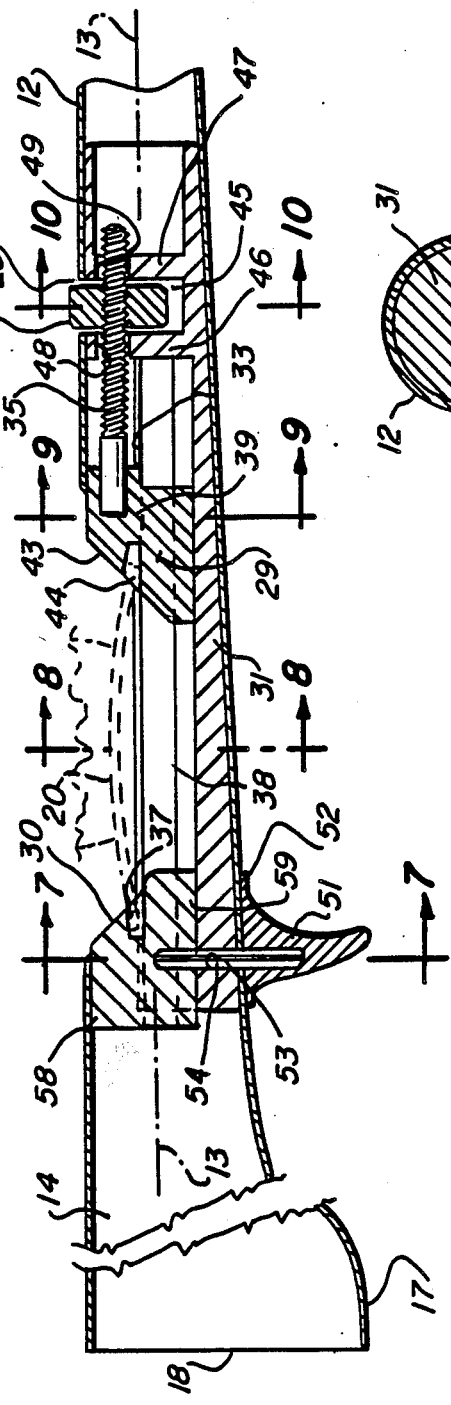
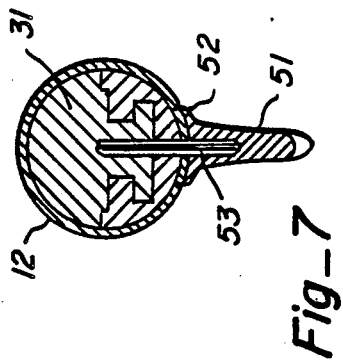
Fig._3
Fig._4
Fig._7

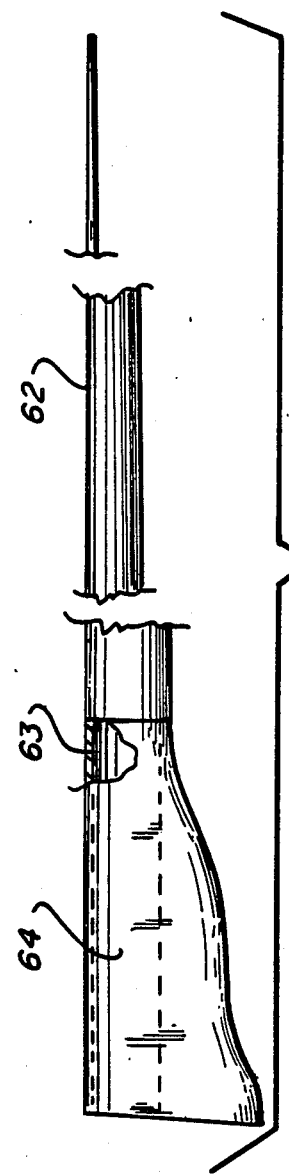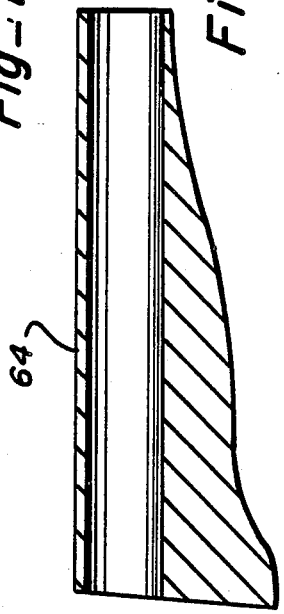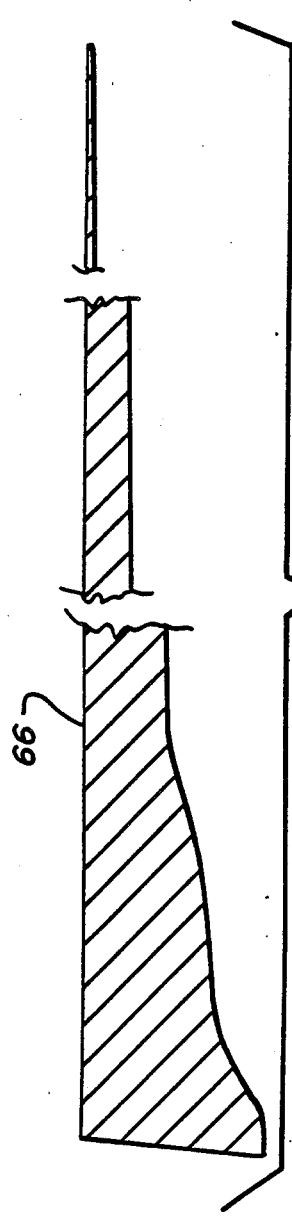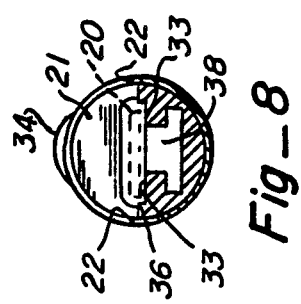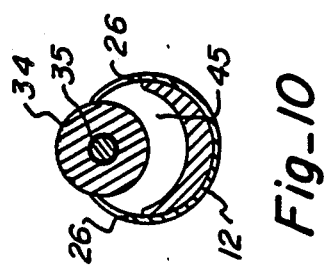

CASTING ROD HAVING ONE-PIECE ROD AND HANDLE BODY

TECHNICAL FIELD

This invention relates generally to improvements in fishing rods and more particularly to a novel and improved casting rod of the pistol grip type.

BACKGROUND ART

The casting rod having a pistol grip type handle is one of the most popular configurations among fishermen because it provides a secure, comfortable grip for fisherman who cast lures and retrieve them for many hours at a time.

In the past, casting rods of the pistol grip type have been made with a graphite rod blank, and the handle as separate parts and of dissimilar materials with these two parts being connected at a joint. This construction using a graphite rod blank has proven to be more sensitive and lighter than similar structure with the blank made from fiberglass.

It has been found, however, that sensitivity to a fish on the line is lost because the rod blank and handle are two separate parts connected at a joint through which vibrations must be transmitted. Secondly, the handles of present rods have cork, rubber or some type of dense foam material that serve to dampen sensitivity by absorbing vibrations rather than transmitting them through the handle to the hand of the angler.

In the casting rod described in U.S. Pat. No. 4,516,351 the rod blank is extended back through the handle body to increase the sensitivity as compared to rod blanks that fit into a hole in the forward end of the handle body.

DISCLOSURE OF INVENTION

A casting rod of the pistol grip type disclosed has a hollow rod and handle body made as one piece that is uninterrupted from end to end. The body includes a tapered rod portion concentric with a longitudinal center axis and a handle portion merging with and extending rearwardly from the rod portion. The handle portion has an offset portion displaced from the longitudinal center axis of the tapered rod portion to provide an offset pistol grip. The external surface of the pistol grip handle portion preferably is uncovered to directly engage the hand of the user so there is no interruption of transmitted vibrations through the body to the hand of the user. The method of making the rod and handle body involves using a mandrel on which a material such as a fiber mat, preferably a graphite fiber matrix, may be placed and held in place using a thermosetting resin and both the rod and handle body are formed into one piece in a molding operation. In the novel method, a metal mandrel having a tapered forward portion and a straight rear portion supporting a slide-on pistol grip shape is used or the mandrel may be of a single piece of the required shape to form both the handle and rod in the molding operation.

DESCRIPTION OF THE DRAWINGS

The details of the invention will be described in connection with the accompanying drawings in which FIG. 1 is a side elevation view of a casting rod embodying features of the present invention;

FIG. 2 is an exploded view of the several parts of the casting rod shown in FIG. 1;

FIG. 3 is a top elevation view of a portion of the casting rod shown in FIG. 1;

FIG. 4 is a sectional view taken along lines 4—4 of FIG. 3;

FIG. 5 is a sectional view taken along lines 5—5 of FIG. 1;

FIG. 6 is a sectional view taken along lines 6—6 of FIG. 1;

FIG. 7 is a sectional view taken along lines 7—7 of FIG. 4;

FIG. 8 is a sectional view taken along lines 8—8 of FIG. 4;

FIG. 9 is a sectional view taken along lines 9—9 of FIG. 4;

FIG. 10 is a sectional view taken along lines 10—10 of FIG. 4;

FIG. 11 is a side elevation view of a mandrel for making the rod and handle body;

FIG. 12 is a longitudinal sectional view of the rear handle forming part of the mandrel shown in FIG. 11;

FIG. 13 is a side elevation view of a one-piece mandrel for use in making the rod and handle body.

DETAILED DESCRIPTION

Referring now to the drawings there is shown a casting rod of the pistol grip type having a hollow one-piece rod and handle body 11 which includes a hollow tapered rod portion 12 of circular cross-section arranged concentric with a longitudinal center axis indicated at 13 and a handle portion 14 merging with and extending rearwardly of the rod portion 12. The handle portion 14 includes an offset section 15 displaced below the longitudinal center axis 13 of the rod portion. The offset section 15 has a downwardly extending bulbous portion 16 extending along an arc as viewed from the side and has a generally oval cross-section which gradually increases in size toward the rear. A second downwardly extending bulbous portion 17 is formed along a second arc as viewed from the side and has an oval shaped cross-section which gradually increases in size toward the rear.

Further, the handle portion 14 has a center line 19 that is offset at an angle designated A from the center line 13 of the rod portion 12. The top of the handle portion is shown as parallel to center line 13 but it is understood this could be tilted downwardly and rearwardly or raised where the pistol grip begins to form. The rod and handle body has a rear end opening 18.

The rod and handle body 11 is made of the same type of material, either woven or linear fiber, from end to end and has a substantially uniform molecular structure throughout so there are no joints and no interruption of transmitted vibrations through the body to the hand of the user gripping the handle portion 12. A preferred material is an impregnated graphite fiber mat with a thermosetting resin or fiberglass mat of the composition similar to that presently being used to make the rod blanks. Preferably, rod portion 12 is made of linear fibers and handle portion 14 is made of woven fibers.

The rod and handle body 11 preferably has a top opening 21 for receiving the base or foot 20 of a casting reel. The top opening 21 is defined by making a cut that extends down into the circular body along a chord line of the circular cross-section and located a distance above the center to provide a pair of parallel side edges 22, a cut along a line that extends forwardly and upwardly from edge 22 at an incline to provide a generally U-shaped beveled front edge 23 and a cut along a line that extends rearwardly and upwardly at an incline from edge 22 to provide a generally U-shaped beveled rear edge 24. These cuts to form top opening 21 preferably is made in the rod and handle body 11 by using a grinding stone or the like.

The rod and handle body 11 has another top opening 25 forwardly of top opening 21 defined by a cut down into the circular body along a chord line of the circular cross-section a greater distance above the center or section of less depth to provide a pair of oppositely disposed side edges 26 as well as an inverted U-shaped front edge 27 and an inverted U-shaped rear edge 28.

A reel support and clamp assembly 29 is provided to releasably clamp the casting reel base 20 at a recessed position inside the rod and handle body 11 through top opening 21. Assembly 29 includes an elongated reel support body 31 and a reel clamp 32 supported for sliding movement over a recessed top surface 33 of the support body 31 with the reel clamp 32 being moved upon the rotation of a nut 34 threaded on a bolt 35 with external threads offset to and projecting forwardly of the reel clamp. The nut 34 shown is circular and has a bore with internal threads and a knurled peripheral surface.

The reel support body 31 is of a generally cylindrical shape that is slightly tapered by increasing in diameter toward the rear to be complementary to and conform to the inside taper of hollow body 11 and slidably inserted through the rear end opening 18.

The recessed top surface 33 is formed by making a horizontal cut along a chord line of the circular cross-section a distance above the center. Raised portions 36 are provided along each side of the reel seat that is flush with the side edges 22 of the body 11 to prevent the reel from twisting. The rear portion of surface 33 below the top opening 21 forms a reel seat on which the top of the reel base is supported to dispose the reel base in close proximity to the center of the rod portion. The reel support body 31 has a rear wall 58 having a beveled rear wall surface 30 extending up and rearwardly. A rear notch 37 in wall portion 58 at the base of surface 30 receives the rear end of the reel base and holds the reel base against being pulled out. The rear wall 58 is formed as a separate body with a lower section 59 that slides into a channel-like slot 38 of an inverted T-shape centered in the recessed top surface 33 and extending down past the center of the body providing a guideway for the rear wall body 58 and reel clamp 32 described hereinafter.

The reel clamp 32 shown includes a clamp body 39 having an upper section 40 of circular cross section with an arc less than 180 degrees that is concentric with and telescopically received within an upper portion of the hollow body 11 and has a cut along a chord line that provides an under surfaces 41 along both sides that slides along the recessed top surface 33. Clamp body 39 includes an inverted T-shaped lower section 42 complementary in shape to the lower slot 38 of the support member to be slidably guided and retained in the slot. The reel clamp body 39 has a beveled front wall surface 43 and a front notch 44 below the bevel in line with the recessed top surface 33 to receive and retain the front end of the reel base. The externally threaded bolt 35 is connected to and projects forwardly of said clamp body 39.

The reel support body 31 has a cut along a chord line to provide a front notch 45 bounded by axially spaced front and rear transverse wall portions 46 and 47. Aligned openings 48 and 49 are provided in wall portions 46 and 47, respectfully, through which the threaded bolt 35 slidably extends. Nut 34 is disposed in notch 45 and projects above the top of the rod body 11 so that as the nut 34 is rotated the clamp 32 is advanced and retracted over surface 33.

A trigger body 51 with a top flange 52 that conforms to the curvature of the body 11 and abuts thereagainst has a centered pin 53 extending up from flange 52 and pin inserts into an opening 54 in the rod and handle body 11 and support body 31 to be fastened to the body and assembly as with an adhesive.

A closure cap 55 has a flange 56 that slide fits into and a step 57 that abuts against the end and closes the rear end of the rod and handle body after the support body 31 has been inserted.

To assemble the parts of the above described casting rod, the lower section 42 of the reel clamp is slid into the open rear end of slot 38 and the reel clamp 32 is moved along on the top support surface 33 until the threaded bolt 35 is inserted into the opening 48. The lower section 59 of the rear wall body 58 is inserted into slot 38 and affixed in place as by an adhesive. This reel support and clamp assembly 29 is inserted into the rear end opening 18 and until the beveled surface 30 is flush with beveled surface 24. The nut 34 is inserted into the notch 45 and the nut 34 is threaded onto the bolt 35. A vertical hole 54 is drilled in through the body 31 and the trigger pin 53 is inserted in hole 54 and the trigger is secured in place as with an adhesive. The closure cap 55 is placed over the opening in the rear.

The method of making the above described rod and handle body will now be discussed with particular reference to FIGS. 11, 12, and 13. The mandrel shown in FIG. 11 has a tapered forward portion 62 and a straight rear portion 63. The rear portion 63 preferably is a straight cylinder with a diameter slightly less, preferably approximately ⅛", than the rear end diameter of the tapered forward portion 62. The mandrel has a hollow pistol grip mold shape 64 having an internal diameter sized so it will slide fit on the straight rear portion 63. This rear mold shape 64 is preferably an injection molded piece from a very thin, light weight material such as a high graphite content thermoplastic. This molded piece 64 can either be left in or removed. Another mandrel would be a single piece of metal having the desired external shape as is illustrated in FIG. 14 and designated by number 66.

In making the rod and handle body, the material used preferably is a graphite fiber mat, and this material is first cut into long tapered triangles and laid on a stationary bed. The mandrel is laid on the edge of this stack of material and is fastened to the material by a thermosetting resin which is a sticky substance. In the wrapping of the material on the mandrel, the tapered portion 62 is wrapped first and a hydraulic steel plate rolls the mandrel and the material together into one piece. The rear mandrel 63 is slid into place and then the mat material is wrapped on mandrel 63 and back over a length of the tapered mandrel 62 such as to a point about 18 inches from the mandrel shape 63. Next the wrapped material and mandrel are put through a high speed cellophane machine which holds the material tightly on the mandrel. The next step is to bake the material, mandrel and cellophane until the material is bonded. Finally, the cellophane after baking is stripped off and the body is sanded and dipped in a finish and then baked again to obtain a high luster. A significant difference in the above method as compared to the prior art is that the rod and handle are formed in the same operation to form a one-piece rod and handle body.

Although the present invention has been described with a certain degree of particularity, it is understood that the present disclosure has been made by way of example and that changes in details of structure may be made without departing from the spirit thereof.

What is claimed is:

1. In a casting rod of the pistol grip type the combination comprising:
   a hollow, one-piece rod and handle body uninterrupted from end to end, so there is substantially no interruption of transmitted vibrations through said body, said rod and handle body including a hollow, tapered rod portion of generally circular cross-section concentric with a longitudinal center axis, a hollow, tapered intermediate portion of generally circular cross-section concentric with said longitudinal axis merging with an extending rearwardly of said rod portion, and an offset pistol grip hollow handle portion merging with and extending rearwardly from said intermediate portion, said intermediate portion being enlarged with respect to said rod portion to accomodate an operative association with a reel base, said intermediate portion forming a continuous, non-jointed, integral extension of said rod portion, said handle portion forming a continuous, non-jointed integral extension of said intermediate portion, said handle portion having an offset hollow section displaced from said longitudinal center axis.

2. A casting rod as set forth in claim 1 wherein said handle portion has an uncovered exterior surface to come into direct contact with the hand of the user.

3. A casting rod as set forth in claim 1 wherein said body is a graphite fiber mat impregnated with a thermosetting resin so as to have a substantially uniform molecular structure throughout.

4. A casting rod as set forth in claim 1 wherein said body has a rear end opening and further including a cap closing said rear end opening.

5. A casting rod as set forth in claim 1 wherein said intermediate portion of said body has a cut-out opening for receiving a base of a reel.

6. A casting rod as set forth in claim 1 wherein said body has an opening for receiving a rotary nut to advance and retract a reel clamp in said body.

7. A casting rod as set forth in claim 1 including a trigger body having a pin projecting upwardly from the top thereof and extending into said rod and handle body.

8. A casting rod as set forth in claim 1 including a reel support and clamp assembly in said body to releasably clamp the base of a reel within said body.

9. A casting rod as set forth in claim 8 wherein said reel support and clamp assembly includes a reel support body that is elongated and generally cylindrical in shape to be complementary to and slide fit within an intermediate portion of said rod and handle body.

10. A casting rod as set forth in claim 9 wherein said reel support body has a recessed top surface including a rear portion forming a reel base seat and a forward portion over which a movable reel clamp is moved.

11. A casting rod as set forth in claim 10 wherein said recessed top surface includes raised portions on opposite sides of said reel base seat to prevent the reel base from twisting.

12. A casting rod as set forth in claim 9 wherein said support body has a rear wall portion with a rear notch for retaining the rear end of a reel base.

13. A casting rod as set forth in claim 12 wherein said rear wall portion has a lower section that slides in a slot in said support body.

14. In a casting rod of the pistol grip type the combination comprising:
    a hollow, one-piece rod and handle body and uninterrupted from end to end, so there is substantially no interruption of transmitted vibrations through said body, said rod and handle body including a hollow, tapered rod portion of generally circular cross-section concentric with a longitudinal center axis and an offset pistol grip handle portion merging with and extending rearwardly from said rod portion, said handle portion having an offset hollow section displaced from said longitudinal center axis,
    a reel support and clamp assembly in said body to releasably clamp the base of a reel within said body,
    said reel support and clamp assembly including a reel support body that is elongated and generally cylindrical in shape to be complementary to and slide fit within an intermediate portion of said rod and handle body,
    said reel support body having a recessed top surface including a rear portion forming a reel base seat and a forward portion over which a movable reel clamp is moved,
    said reel support and clamp assembly including a movable clamp body having an arcuate upper section concentrically arranged and telescopically received in an upper portion of said rod and handle body and has oppositely disposed under surface portions that slide over a forward portion of said recessed top surface.

15. A casting rod as set forth in claim 14 wherein said clamp body has a lower section that slides in a slot in said support body extending below said recessed top surface.

16. A casting rod as set forth in claim 15 wherein said lower section and said slot are of an inverted T-shaped whereby said reel clamp is retained and guided during movement relative to said support body.

17. A casting rod as set forth in claim 14 including a treaded bolt connected to and projecting forwardly from said clamp body, said bolt extending through a wall portion of said support body and into a notch in said support body, a nut in said notch threaded on said bolt and projecting through an opening in said rod and handle body to advance and retract said clamp body along said support body as said nut is rotated.

18. A casting rod of the pistol grip type, comprising:
    a hollow, one-piece, rod and handle body made of the same type of material and uninterrupted from tip to butt end;
    said rod and handle body including a hollow, tapered rod portion of circular cross-section concentric with a longitudinal center axis, a hollow, tapered intermediate portion of generally circular cross-section concentric with said longitudinal axis merging with and extending rearwardly of said rod portion, and an offset pistol grip hollow handle portion merging with and extending rearwardly from said rod portion, said intermediate portion being enlarged with respect to said rod portion to accomodate an operative association with a reel base, said intermediate portion forming a continuous, non-jointed, integral extension of said rod portion, said handle portion forming a continuous, non-jointed integral extension of said intermediate portion, said handle portion having an offset, hollow bottom section misplaced below said longitudinal center axis and having an uncovered exterior grip surface to come into direct contact with the hand of the user so there is substantially no interruption of transmitted vibrations through said body;

a reel support and clamp assembly in said intermediate portion having a recessed top surface below an opening in said intermediate portion forming a reel base seat and a surface portion over which a movable reel clamp is moved to secure a reel base in said intermediate portion.

19. A casting rod of the pistol grip type, comprising:

a hollow, one-piece, non-jointed, rod and handle body made of the same type material and substantially uniform molecular structure throughout and uninterrupted from end to end;

said rod and handle body including a hollow, tapered rod portion of circular cross-section concentric with a longitudinal center axis and an offset pistol grip hollow handle portion merging with and extending rearwardly from said rod portion, said handle portion having an offset, hollow bottom section displaced below said longitudinal center axis and having an uncovered exterior surface so there is substantially no interruption of transmitted vibrations through said body;

said body having a first top opening and a second top opening forwardly of said first opening;

a reel support and clamp assembly in said body;

said assembly including a support body having a recessed top surface including a rear portion under said first opening forming a reel base seat and a forward portion over which a movable reel clamp is moved, said reel clamp having a front notch for retaining the front end of a reel base;

said support body having a rear notch for retaining the rear end of a reel base;

said reel clamp including a clamp body having an arcuate upper section of circular cross-section that is coaxially aligned and telescopically received in an upper portion of said rod and handle body and has under surface portions that slide over said recessed top surface;

said clamp body having a threaded bolt projecting forwardly thereof and a nut threaded on said bolt and projecting through said second opening to advance and retract said clamp body along said support body as said nut is rotated and a trigger connected to said body opposite said first top opening.

* * * * *